United States Patent [19]
Chan et al.

[11] Patent Number: 6,129,007
[45] Date of Patent: Oct. 10, 2000

[54] ELECTRIC TOASTER

[75] Inventors: Chi Tong Chan; Chun Ying Yeh, both of Chai Wan, The Hong Kong Special Administrative Region of the People's Republic of China

[73] Assignee: Simatelex Manufactory Co., Ltd., The Hong Kong Special Administrative Region of the People's Republic of China

[21] Appl. No.: 09/496,256

[22] Filed: Feb. 1, 2000

[51] Int. Cl.[7] ..................................................... A47J 37/08
[52] U.S. Cl. ..................... 99/327; 99/329 P; 99/329 RT; 99/332; 99/385; 99/389; 99/391; 219/521
[58] Field of Search ............................. 99/325–335, 339, 99/340, 385–391, 399–402, 426, 337, 486, 338; 219/518, 519, 521, 386, 481, 489, 413, 492, 493, 497; 426/241, 243, 466, 523

[56] References Cited

U.S. PATENT DOCUMENTS

| | | | |
|---|---|---|---|
| 1,893,989 | 1/1933 | Galer | 99/390 X |
| 1,926,276 | 9/1933 | Forbes | 99/332 |
| 1,967,209 | 7/1934 | Lawrence | 99/327 |
| 1,979,845 | 11/1934 | Schallis | 99/332 |
| 2,631,523 | 3/1953 | Olving | 99/331 X |
| 3,956,978 | 5/1976 | Borley | 99/329 R |
| 4,345,513 | 8/1982 | Holt | 99/401 X |
| 5,018,437 | 5/1991 | San Juan | 99/327 |
| 5,044,263 | 9/1991 | Birkert et al. | 99/327 |
| 5,304,782 | 4/1994 | McNair et al. | 219/497 X |
| 5,771,780 | 6/1998 | Basora et al. | 99/389 X |
| 5,802,957 | 9/1998 | Wanat et al. | 219/521 X |
| 6,014,925 | 1/2000 | Basora et al. | 99/327 |

*Primary Examiner*—Timothy Simone
*Attorney, Agent, or Firm*—Jackson Walker L.L.P.

[57] ABSTRACT

An electric automatic pop-up toaster has a carriage and a pivotably connected manually operative arm for moving the carriage to a lowermost position for toasting in well-known manner. At the beginning of each toasting cycle, the arm is horizontal and a latching plate is magnetically held down to hold the arm and the carriage in a lowermost position. The arm presses against a wire spring to hold closed a power switch (not shown) that supplies power to heating elements of the toaster. The latching plate is (magnetically) released at the end of each toasting cycle by a timer. This allows the carriage to move upwards to pop-up toasted bread in a usual way. However should the carriage fail to move upwards when the latching plate is released, the arm is pivoted by a spring and tilted to the position shown in the Figure. The wire is therefore released and enters a slot in a bracket mounted to the carriage. The switch opens and remains open to prevent power being re-instated to the heating elements. Even if the arm is thereafter pushed down, the switch cannot be closed because no downward pressure can be applied to the spring until the carriage has moved upwards beyond an intermediate position.

3 Claims, 2 Drawing Sheets

ELECTRIC TOASTER

BACKGROUND OF THE INVENTION

1. Field of the Invention

The invention relates to electric toasters.

2. Description of Prior Art

Electric toasters or so-called "pop-up toasters" are well-known and typically include timers or other devices to automatically turn of electrical power to heating elements at the end of a toasting cycle. At the same time, a spring biassed bread rack is released inside the toaster to allow the toast to pop-up and be removed for use. Commonly the opening of a switch and the mechanical release of a pop-up catch are inter-related and so if a toasted slice of bread jams, the power may be prevented from being turned OFF. This leads to the possibility of burning the toast and also creating a fire-hazard.

SUMMARY OF THE INVENTION

It is an object of the invention to overcome this problem.

According to the invention there is provided an electric automatic pop-up toaster including a slidably mounted upwardly biassed carriage attached to a bread rack, a releasable catch arranged to hold down the carriage during toasting of slices of bread supported on the rack, a biassed manually engageable operating arm pivotably connected to the carriage to which the catch is mounted, an electrical power switch arranged to supply power to heating elements of the toaster that is closed by the arm when it is pressed down into a lowermost position, and means for automatically releasing the catch at the end of a toasting cycle to allow the arm to pivot and so allow the electrical switch to open.

The releasable catch may comprise a movable magnetically dependent component of an auxiliary electrical switch that is arranged to close whenever the arm is pressed down with the carriage to the lowermost position and in which the component is automatically magnetically released when power is interrupted to the auxiliary switch by a timer to allow the arm to pivot.

The toaster may include means for automatically mechanically disabling the arm from closing the power switch after the catch has been released until the carriage has moved above an intermediate position, above its lowermost position, and thereby temporarily preventing the power switch from being manually closed again by the arm before the bread rack has moved above a corresponding intermediate position.

BRIEF DESCRIPTION OF THE DRAWINGS

An electric pop-up toaster according to the invention will now be described by way of example with reference to the accompanying schematic drawings in which.

DESCRIPTION OF THE PREFERRED EMBODIMENT

Figure 1:
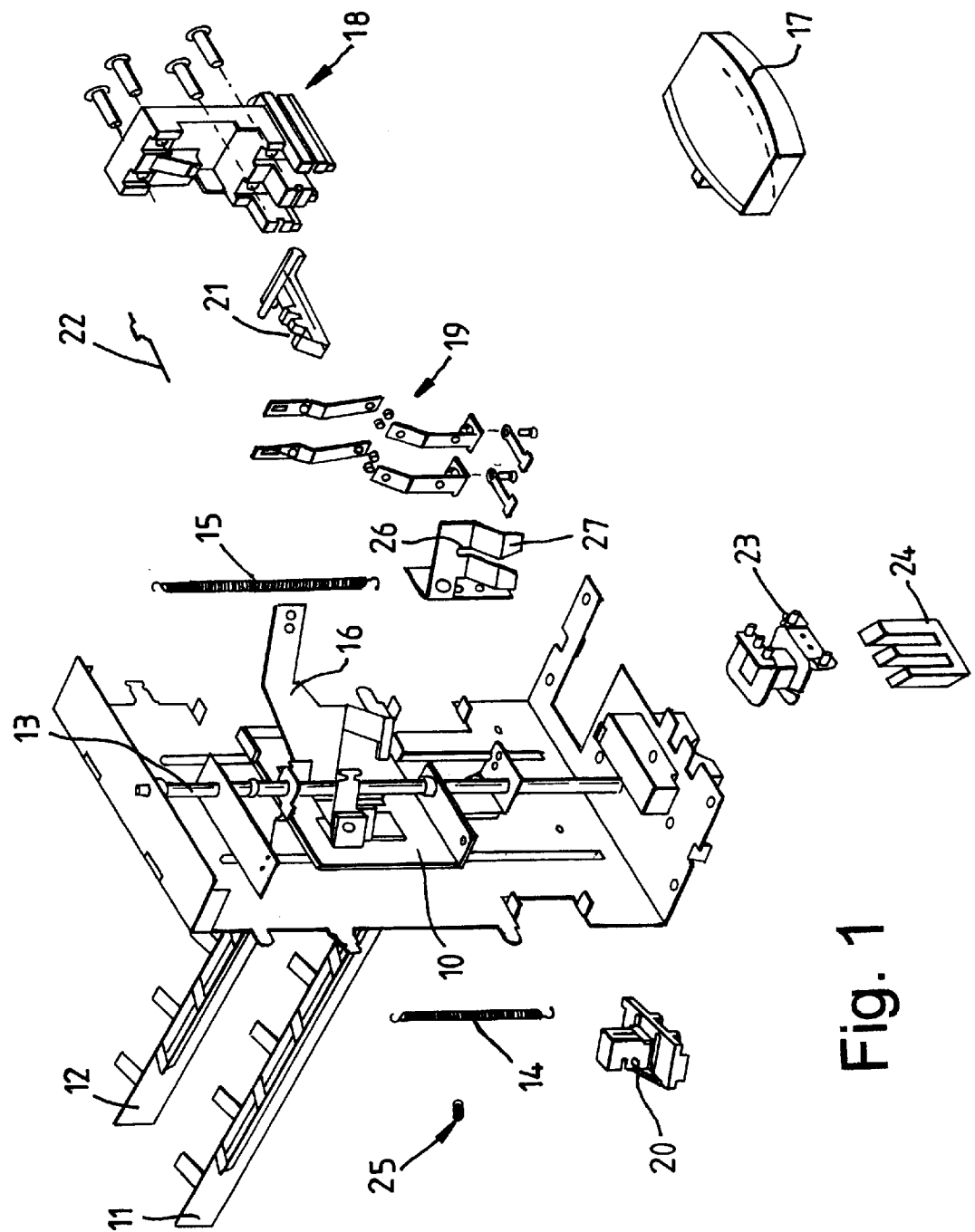
FIG. 1 is an exploded view of major components of the toaster.

Referring to the drawings, in FIG. 1 the overall arrangement conforms to well-known designs of pop-up toasters in wide use. A carriage 10 is attached to bread racks 11 and 12 and slidably mounted on a vertical rod 13 at one side of a toaster body (not shown). Springs 14 and 15 bias the carriage upwardly. An operating arm 16 and a finger push button 17, that fits to an end of the arm 16, are provided for manually pushing the carriage 10 downwards to a lowermost position to commence a toasting cycle in use. The toaster includes an electrical power switch 18 that has resiliently biassed contacts 19. An auxiliary arm 21 has a wire spring 22 that fits to a remote end thereof to form a resilient extension of the arm 21. The arm 21 is mechanically coupled to and moved with the resilient contacts 19. Power is interrupted to a solenoid coil 23 under the control of a suitable timer (not shown) in a manner generally well-known in the art, so that the carriage 10 is released automatically at the end of each toasting cycle and allows the spring 22 to move upwards and the switch 18 to open.

A latching plate 20 is provided that attaches to a lower side of the arm 16 and cooperates with a coil 23 and a ferromagnetic core 24 that are fixed to a chassis member of the toaster. Components 20, 23 and 24 form an auxiliary electrical switch. When the arm 16 is pushed down and the carriage 10 reaches its lowermost position, the latching plate 20 rests adjacent the top of the core 24. While power is being supplied to the coil 23, the latching plate 20 acts as a hold-down catch for the arm 16 and hence the carriage 16 during each toasting cycle.

In normal operation, slices of bread are placed on the racks 11 and 12 and the button 17 pressed down to move the carriage 10 to its lowermost position. The arm 16 bears against the spring 22 and cloves the contacts 19 of the power switch 18, The timer begins timing when the auxiliary switch closes to time a toasting period. Current flows through the coil 23 and the latching plate 20 is held down by a magnetic field. In the meantime, power flows to heating elements via the switch 18 to toast the bread. At the end of each toasting cycle, current to the coil 23 is interrupted by the timer and the latching plate 20 is (magnetically) released to allow the carriage 10 (and the arm 16) to move upwards under the action of the springs 15 and the toasted bread to "pop-up". The power switch 18 automatically OPENS because the arm 16 no longer presses down on the spring 22. Thus far the described toaster operates in the same is manner as well-known toasters already widely in use in the market place.

Figure 2:
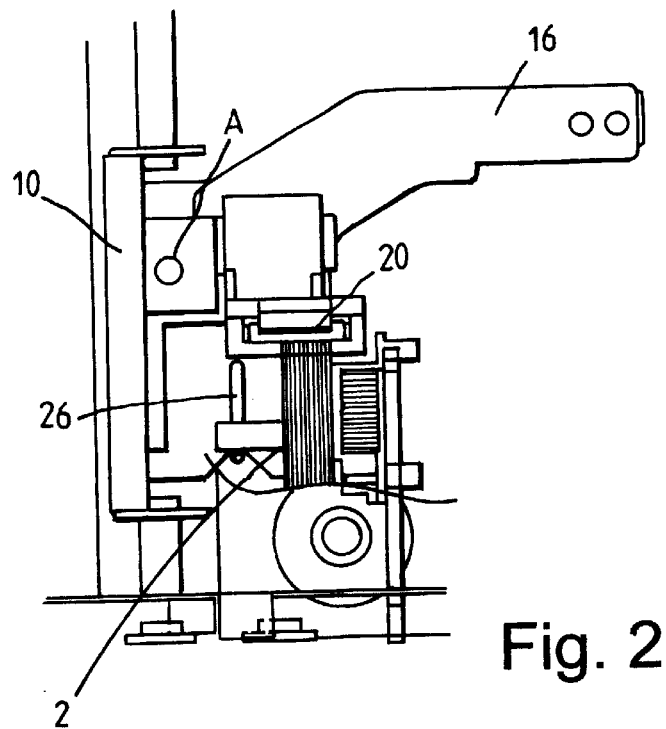
FIG. 2 is a side view of part of FIG. 1 showing one configuration of an operating arm.

In FIG. 2, it can be seen that the operating arm 16 is pivotably connected at A to the carriage 10. The arm 16 is biassed upwardly by a spring 25 (shown in FIGS. 1 and 3). When the carriage 10 is in its lowermost position, in FIG. 2, the arm 16 is horizontal and the latching plate 20 is positioned immediately above the core 24. As explained above, if the coil 23 is receiving current, the arm 16 will be held down by the latching plate 20 to hold the carriage in its lowermost position, as required for toasting. As the arm 16 is moved down a lower surface 16A bears against the spring 22 to close the power switch 18 as required, for each toasting cycle.

At the end of each toasting cycle, the arm 16 is released as described above in the normal way. As a result the contacts 19 are allowed to spring OPEN and the auxiliary arm 21 and hence the spring 22 move upwards. Thus, in normal operation, the carriage 10 will "pop-up" the toast under the action of the springs 14 and 15.

Figure 3:
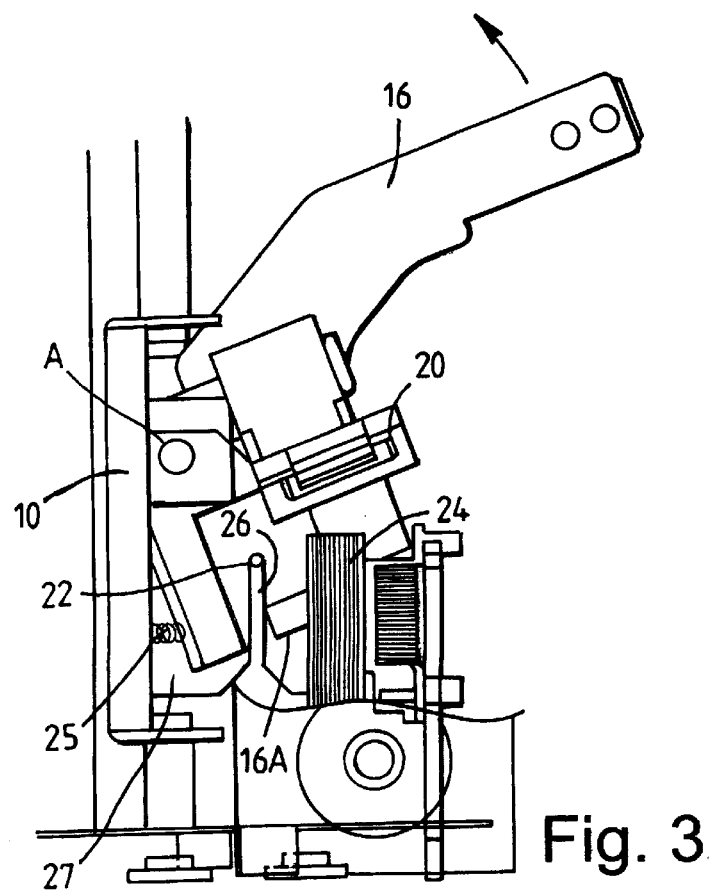
FIG. 3 is a side view of part of FIG. 1 with the operating arm in a different position.

The configuration shown in FIG. 3 occurs if the carriage 10 fails to move upwards at the end of a toasting cycle, as would be the case if the carriage jams in some way or is held down by the toast itself. In that case when the latching plate 20 is (magnetically) released the arm 16 pivots upwards under the action of the spring 25. This allows the spring 22 to enter and be movable up a slot 26 formed in a bracket 27 fixed to the carriage 10. This means that if the operating arm 16 is thereafter pushed down, the spring 22 is not engaged by the arm 16 being at that stage above the lower surface 16A, which is normally used to bear down on the spring 22 to close the switch 18. Movement of the arm 16 downwards from the position shown in FIG. 3 therefore cannot close the switch 18. Power cannot therefore be re-applied to the heating elements. Thus, even if the carriage 10 is jammed in its lowermost position, no further heating will take place until after the carriage 10 has been properly raised up. The described embodiment therefore includes an extra safety feature, apart from heating power being turned OFF at the end of each toasting cycle. The extra feature prevents a user manually re-establishing heating current, that is turning ON power to the heating elements once the timer has timed-out. Thus, even if a user tilts or pushes the arm 16 downwards, in FIG. 3, the switch 18 does not close to establish power supply to the heating elements. Of course, if the carriage 10 is moved upwards, from the position shown in FIG. 3, beyond an "intermediate position" where the spring 22 is again below the lower surface 16A and in effect close off the bottom of the slot 26, power supply can be re-established for a next toasting cycle. This is because the bottom of the arm 16 can again bear on the spring 22 to push it downwards to close the switch 18.

Thus, in the described embodiment two safety features are provided if the carriage 10 jams in its lowermost position. The power supply to the heating coils will be automatically turned OFF at the end of a toasting cycle and it is not possible to manually re-establish the power supply before the carriage 10 has been moved at least above the intermediate position. That is to say, the arm 16 is mechanically disabled from closing the power switch 18 until the carriage 10 has been moved above the intermediate position. This upward movement in effect re-sets the mechanism automatically, so that after a malfunction has been resolved, a next toasting cycle may be initiated in the normal way.

It will therefore be appreciated in the described embodiment that a dual safety function is provided. In other embodiments of the invention however, only one or the other of the safety functions might be provided. Also, the switching and catch releasing functions can be provided in other ways for incorporation in other embodiments of the invention. It is in effect technically necessary in embodiments of the invention to ensure that when the toasting cycle ends, a hold down catch is automatically released and the power supply switch is opened even if the carriage remains, against the bias of its lifting springs, in its lowermost position. This is a problem that prior art designs failed to deal with. While it remains preferable, as in the described embodiment, to also ensure that the switch 18, normally closed by pushing the arm 16 downwards, cannot be re-closed until the carriage has released and moved upwards beyond the intermediate position, it may not be essential in some applications. Further, it will be appreciated that other mechanical "locking mechanisms" may be used to achieve the temporary disablement of the power switch closing function of the arm 16. Such alternative arrangements nevertheless fall within the scope of the claims of this invention.

We claim:

1. An electric automatic pop-up toaster including a slidably mounted upwardly biassed carriage attached to a bread rack, a releasable catch arranged to hold down the carriage during toasting of slices of bread supported on the rack, a biassed manually engageable operating arm pivotably connected to the carriage to which the catch is mounted, an electrical power switch arranged to supply power to heating elements of the toaster that is closed by the arm when it is pressed down into a lowermost position, and means for automatically releasing the catch at the end of a toasting cycle to allow the arm to pivot and so allow the electrical switch to open.

2. An electric automatic pop-up toaster according to claim 1, in which the releasable catch comprises a movable magnetically dependent component of an auxiliary electrical switch that is arranged to close whenever the arm is pressed down with the carriage to the lowermost position and in which the component is automatically magnetically released when power is interrupted to the auxiliary switch by a timer to allow the arm to pivot.

3. An electric automatic pop-up toaster according to claim 1, including means for automatically mechanically disabling the arm from closing the power switch after the catch has been released until the carriage has moved above an intermediate position, above its lowermost position, and thereby temporarily preventing the power switch from being manually closed again by the arm before the bread rack has moved above a corresponding intermediate position.

* * * * *